(12) United States Patent
Cis et al.

(10) Patent No.: US 10,731,673 B2
(45) Date of Patent: Aug. 4, 2020

(54) SERVOVALVE

(71) Applicant: Hamilton Sundstrand Corporation, Charlotte, NC (US)

(72) Inventors: Marcin Cis, Lutynia (PL); Sebastian Zuraw, Opole (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/927,403

(22) Filed: Mar. 21, 2018

(65) Prior Publication Data

US 2018/0340555 A1 Nov. 29, 2018

(30) Foreign Application Priority Data

May 29, 2017 (EP) ..................... 17461538

(51) Int. Cl.
*F16K 31/128* (2006.01)
*F15B 13/043* (2006.01)
(Continued)

(52) U.S. Cl.
CPC ............ *F15B 9/07* (2013.01); *F15B 13/0402* (2013.01); *F15B 13/0436* (2013.01);
(Continued)

(58) Field of Classification Search
CPC ........... Y10T 137/8122; Y10T 137/794; Y10T 137/8049; Y10T 137/8085; Y10T 137/2322; Y10T 137/86622; Y10T 137/86702; Y10T 137/86614; F16K 11/0708; F16K 11/0716; F16K 31/128; B01D 29/112; B01D 29/114; B01D 35/28;
(Continued)

(56) References Cited

U.S. PATENT DOCUMENTS 2,884,907 A * 5/1959 Atchley .............. F15B 13/0436
137/48
3,081,787 A * 3/1963 Meulendyk ......... F15B 13/0436
137/625.68
(Continued)

FOREIGN PATENT DOCUMENTS

EP 3321513 A1 5/2018
GB 2104249 A 3/1983
WO 2006060640 A1 6/2006

OTHER PUBLICATIONS

Partial European Search Report for Application No. EP17461538, dated Feb. 22, 2018, 3 pages.

*Primary Examiner* — Matthew W Jellett
(74) *Attorney, Agent, or Firm* — Cantor Colburn LLP (57) ABSTRACT

A servovalve includes a fluid transfer valve assembly comprising a supply port and a control port and a moveable valve spool arranged to regulate flow of fluid from the supply port to the control port in response to a control signal. The servovalve also includes a jet pipe assembly configured to direct fluid to the ends of the spool to axially move the valve spool relative to the fluid transfer assembly in response to the control signal to regulate the fluid flow. The jet pipe assembly comprises a jet pipe a connector header fluidly connecting the jet pipe to a nozzle. The spool has one or more openings 28 is provided in the spool such that fluid from the supply port flows into the interior of the spool and into the jet pipe.

12 Claims, 5 Drawing Sheets (51) Int. Cl.
    *F15B 9/07*       (2006.01)
    *F15B 13/04*      (2006.01)
    *F15B 21/041*     (2019.01)
    *F16K 11/07*      (2006.01)
(52) U.S. Cl.
    CPC ........ *F15B 21/041* (2013.01); *F16K 11/0708* (2013.01); *F16K 11/0716* (2013.01); *F16K 31/128* (2013.01); *F15B 2211/615* (2013.01); *Y10T 137/8122* (2015.04); *Y10T 137/86614* (2015.04); *Y10T 137/86702* (2015.04)
(58) Field of Classification Search
    CPC ............ F01L 2001/3444; F15B 21/041; F15B 13/0402; F15B 13/0436; F15B 2211/615; F15B 9/07
    See application file for complete search history.

(56) References Cited

U.S. PATENT DOCUMENTS

| | | | |
|---|---|---|---|
| 3,272,077 A * | 9/1966 | Meulendyk | F15B 13/0436 137/83 |
| 3,406,701 A * | 10/1968 | Meulendyk | F15B 13/0436 137/625.63 |
| 3,584,638 A * | 6/1971 | Cobb | F15B 13/0436 137/625.63 |
| 3,698,437 A | 10/1972 | Cox | |
| 4,046,061 A | 9/1977 | Stokes | |
| 4,378,031 A * | 3/1983 | Nicholson | F15B 13/0436 137/625.63 |
| 4,922,963 A * | 5/1990 | Robinson | F15B 13/0438 137/625.38 |
| 5,215,111 A * | 6/1993 | Hall, II | G05D 16/202 137/82 |
| 5,284,220 A * | 2/1994 | Shimizu | F15B 13/0402 137/330 |
| 6,786,238 B2 | 9/2004 | Frisch | |
| 7,487,752 B2 * | 2/2009 | Strauss | F01L 1/022 123/90.17 |
| 9,309,900 B2 | 4/2016 | Kopp | |
| 2006/0216167 A1 * | 9/2006 | Achmad | C09B 67/0015 417/375 |
| 2013/0061959 A1 * | 3/2013 | Stephens | F01L 1/344 137/544 |
| 2015/0047729 A1 | 2/2015 | Kopp et al. | |
| 2015/0083243 A1 * | 3/2015 | Yoshida | B01D 35/02 137/544 |
| 2015/0233481 A1 * | 8/2015 | Shimura | F16K 27/048 137/549 |
| 2015/0330521 A1 * | 11/2015 | Marocchini | F16K 11/0712 137/550 |

* cited by examiner

SERVOVALVE

FOREIGN PRIORITY

This application claims priority to European Patent Application No. 17461538.5 filed May 29, 2017, the entire contents of which is incorporated herein by reference.

TECHNICAL FIELD

The present disclosure relates to servovalves used to transfer quantities of, or manage the flow of fluid e.g. air.

BACKGROUND

Servovalves find a wide range of applications for controlling air or other fluid flow to effect driving or control of another part e.g. an actuator.

A servovalve assembly includes a motor controlled by a control current which controls flow to a valve e.g. an air valve to control an actuator. Generally, a servovalve transforms an input control signal into movement of an actuator cylinder. The actuator controls e.g. an air valve. In other words, a servovalve acts as a controller, which commands the actuator, which changes the position of an air valve's (e.g. a so-called butterfly valve's) flow modulating feature.

Such mechanisms are used, for example, in various parts of aircraft where the management of air/fluid flow is required, such as in engine bleeding systems, anti-ice systems, air conditioning systems and cabin pressure systems. Servovalves are widely used to control the flow and pressure of pneumatic and hydraulic fluids to an actuator, and in applications where accurate position or flow rate control is required.

Conventionally, servovalve systems operate by obtaining pressurised fluid from a high pressure source which is transmitted through a load from which the fluid is output as a control fluid. Various types of servovalves are known—see e.g. GB 2104249, US 2015/0047729 and U.S. Pat. No. 9,309,900.

Electrohydraulic servovalves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Particularly in aircraft applications, but also in other applications, servovalves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servovalves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

Jet pipe servovalves provide an alternative to 'flapper'—type servovalves. Jet pipe servovalves are usually larger than flapper type servovalves but are less sensitive to contamination. In jet pipe systems, fluid is provided via a jet pipe to a nozzle which directs a stream of fluid at a receiver. When the nozzle is centered—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centered position. A change in motor current moves the spool to a new position corresponding to the applied current.

As mentioned above, jet pipe servovalves are advantageous in that they are less sensitive to contamination e.g. in the supply fluid or from the valve environment. These valves are, however, more complex and bulkier. Additional joints are required for the fluid supply pipe and the supply pipe from the fluid supply to the jet pipe is mounted outside of the servovalve body in the torque motor chamber. In the event of damage to the pipe, this can result in external leakage. The pipe, being external, adds to the overall size and is more vulnerable to damage.

There is a need for a servovalve arrangement that can handle large fluid flows effectively, whilst retaining a compact design and being less vulnerable to contamination, damage and leakage.

European Patent Application 16461572 teaches a jet-pipe type servovalve wherein fluid is provided to the nozzle via a connector header in fluid communication with the interior of the spool, the spool being provided with one or more openings via which fluid from the supply port enters the interior of the spool and flows into the connector header and to the nozzle.

The servovalve includes drive means for steering the nozzle in response to the control signal. The drive means may include a motor such as a torque motor arranged to steer the nozzle by means of an induced current. Other drive means may be used to vary the position of the nozzle. The drive means may be mounted in a housing attached to the valve assembly.

The arrangement of EP 16461572 enables the conventional outside supply pipe to be removed and allows the jet pipe to be fed with fluid via the spool and a feedback spring. To avoid clogging of the jet pipe/nozzle etc. due to contamination in the fluid, the fluid should be filtered. Conventionally, the fluid will be filtered by an external filter before it enters the jet pipe. This, however, requires filter components to be incorporated in e.g. the connector header, which is difficult to do.

There is, therefore, a need to provide a simpler, more convenient and reliable fluid filtering in such a jet-pipe servovalve.

In one aspect, the present disclosure provides a spool for a servovalve, the spool being provided with one or more openings via which, in use, fluid enters the interior of the spool; wherein the one or more openings comprises filter means for filtering the fluid entering the interior of the spool.

The present disclosure also provides a servovalve comprising: a fluid transfer valve assembly comprising a supply port and a control port; a moveable valve spool arranged to regulate flow of fluid from the supply port to the control port in response to a control signal; and a jet pipe assembly configured to axially move the valve spool relative to the fluid transfer assembly in response to the control signal to regulate the fluid flow; wherein the jet pipe assembly comprises a steerable nozzle from which fluid is directed to the ends of the spool in an amount determined by the control signal; and wherein fluid is provided to the nozzle via a connector header in fluid communication with the interior of the spool, the spool being provided with one or more openings via which fluid from the supply port enters the interior of the spool and flows into the connector header and to the nozzle; and further wherein the one or more openings comprises filter means for filtering the fluid entering the interior of the spool.

The filter means can be e.g. in the form of a perforated sheet around the spool where the opening(s) is/are provided. Alternatively, the spool body may be provided with a perforated wall section wherein the perforations function both as the opening(s) and the filter means.

Preferred embodiments will now be described with reference to the drawings.

DETAILED DESCRIPTION

A servovalve as described below can, for example, be used in an actuator control system. The servovalve is controlled by a torque motor to control a control flow of fluid that is output via e.g. a butterfly value to control the movement of an actuator.

A conventional jet pipe servovalve will first be described. The arrangement comprises a servovalve assembly have a torque motor and a moveable spool mounted in a supporting block, or mounted in a cylinder mounted in a block. The spool is part of a spool assembly having: supply ports, control ports, and a return port. Flow is possible between the ports via a passage through the spool. The torque motor provides current that causes a jet pipe to turn at its end closest to the spool, which end terminates in a nozzle. Supply fluid is provided from the supply port, via a supply pipe to the top of the jet pipe—i.e. the end opposite the end with the nozzle, and the supply fluid flows through the jet pipe and out of the nozzle. A receiver is provided in the block below the nozzle. The receiver provides two channels via which fluid from the nozzle flows into the spool. When no current is applied by the motor to the jet pipe, the nozzle is centered relative to the receiver and supply fluid exiting the nozzle flows equally through both channels and thus equally to both ends of the spool. The spool therefore remains centered—i.e. 'closed' so that no fluid flows through the control ports. When actuator control is desired, the motor provides a control current to the jet pipe causing the nozzle to turn away from the centered position. The supply fluid through the nozzle then flows predominantly through one receiver channel as compared to the other channel. More fluid flows, therefore, into the corresponding end of the spool causing axial movement of the spool with either blocks/occludes the passage between the supply port and the respective control port or opens the passage to allow flow between the two ports, depending on the axial position of the spool due to the position of the nozzle, thus modulating pressure on the control ports and controlling the actuator.

In an example, the assembly is arranged to control an actuator based on the fluid flow from the control port e.g. via a butterfly valve. The servovalve controls an actuator which, in turn, controls an air valve such as a butterfly valve.

Supply pressure is provided to the servovalve housing via supply port and to the spool via spool supply ports. The pressure at return port is a return pressure which will vary depending e.g. on the altitude of the aircraft in flight. Control ports provide a controlled pressure, dependant on the nozzle position and resulting spool position, to be provided to an actuator. A supply pipe is also connected to the supply port and routes supply fluid external to the spool and into the top end of the jet pipe. The supply fluid flows down the jet pipe to the nozzle and exits to the receiver described above. The jet pipe is preferably mounted in a flexural tube. While the nozzle is centered, equal amounts of fluid go to the two ends of the spool.

The spool is in the form of a tubular member arranged in the block to be moved axially by fluid from the jet pipe via the nozzle that is directed at the spool via the receiver.

A feedback spring serves to return the nozzle to the centered position.

In more detail, to open the servovalve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle turns. The more it turns, the greater the linear or axial movement of the spool. A torque motor usually consists of coil windings, a ferromagnetic armature, permanent magnets and a mechanical spring (e.g. two torsional bridge shafts). This arrangement provides movement of the nozzle proportional to the input control current. Other types of motor could be envisaged.

Figure 1:
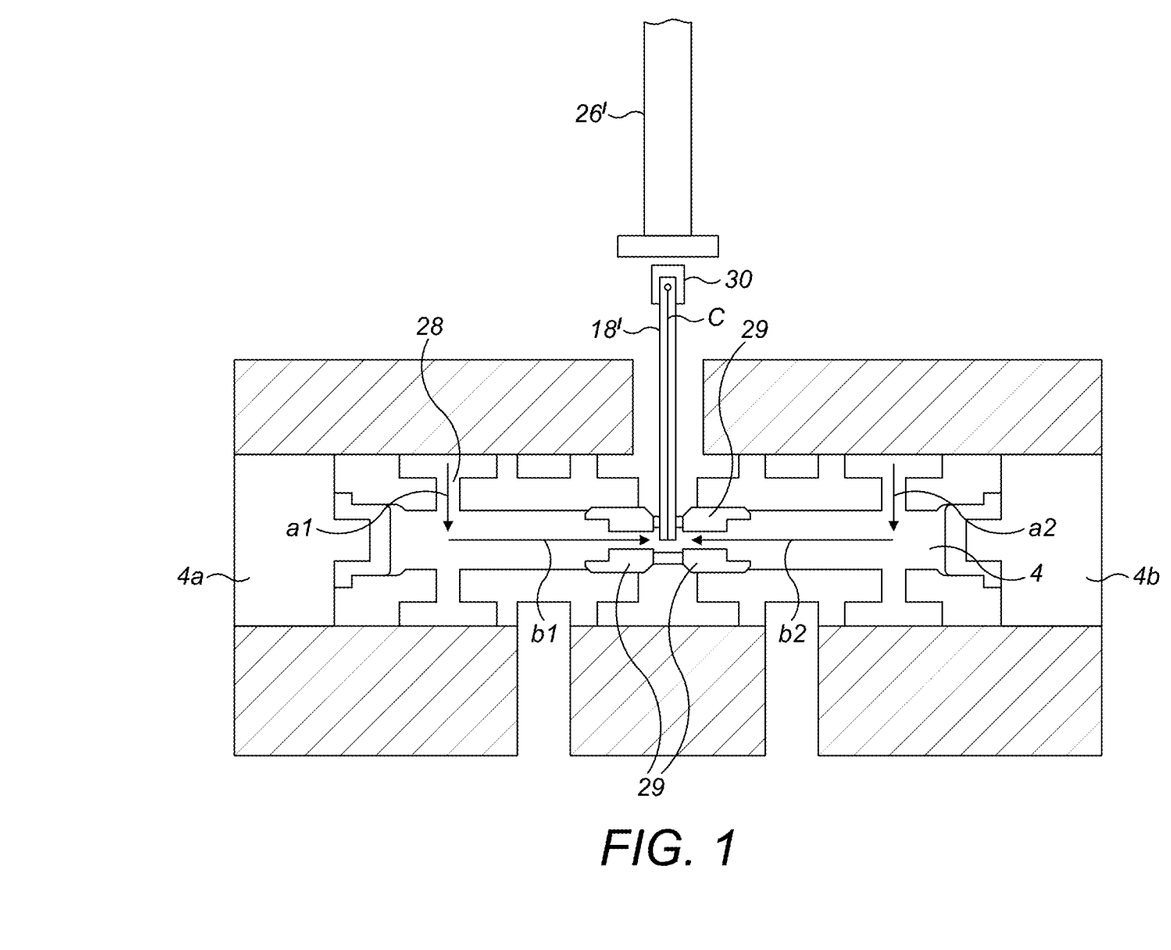
FIG. 1 is a cut-away view of a servovalve according to e.g. EP16461572.
Figure 2:
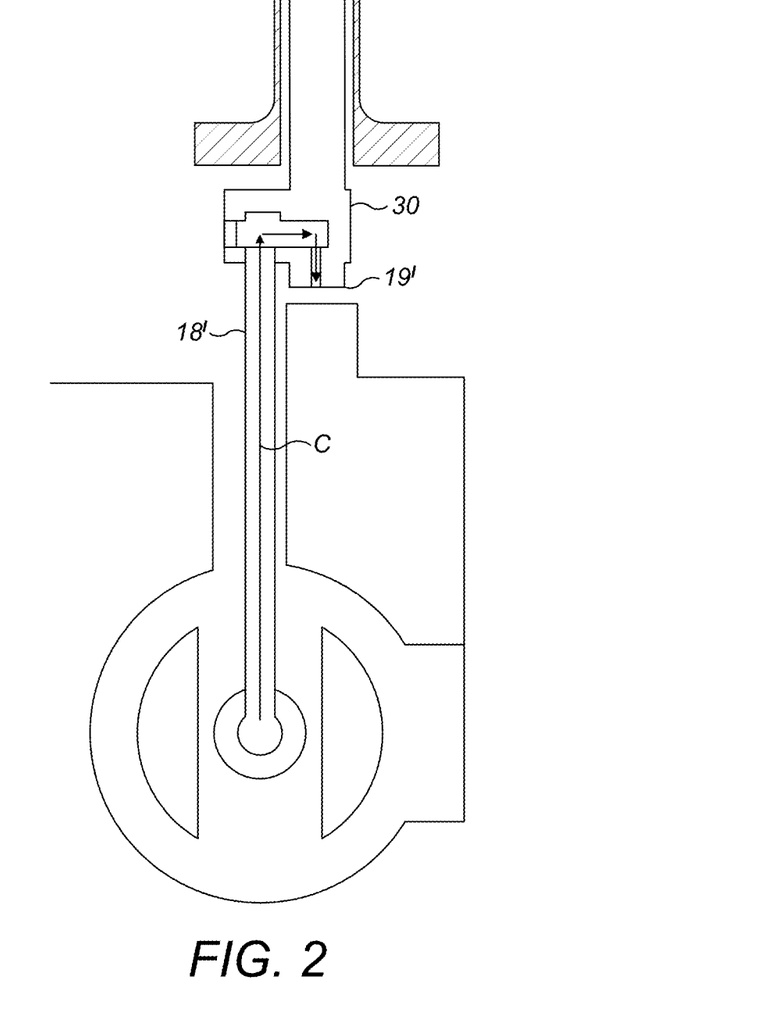
FIG. 2 is a detail of the servovalve of FIG. 1.

The servovalve assembly of EP 16461572, described with reference to FIGS. 1 and 2, avoids the need for the supply pipe, thus avoiding many of the disadvantages of conventional jet pipe servovalves. Instead of providing supply fluid to the jet pipe externally, in the present disclosure the supply fluid is provided to the jet pipe from inside the servovalve assembly, using the flow of supply fluid provided to the spool supply ports. To do this, openings 28 are provided in the wall of the spool 4 to enable the supply fluid provided to the spool 4 via the supply port to flow inside the spool body as shown by arrows a1, a2 of FIG. 1. The jet pipe 18' extends into the interior of the spool 4 and is preferably secured in position e.g. by clamps or screws 29. The supply fluid, which is conventionally supplied at a pressure of around 10 mPa, but may of course be other pressure values including much higher pressures e.g. 21 MPa, flows into the interior of the spool 4 towards the middle (arrows b1,b2) and is drawn up, under pressure, into the end of the jet pipe 18' extending into the spool (arrow c). This end is in fluid engagement with the nozzle 19' as can best be seen in FIG. 2. Arrows d1 and d2 show how the fluid flows from the jet pipe 18' into the nozzle 19' from which it exits as in conventional systems to the receiver 21.

FIG. 1 shows, again by arrows, how the fluid flows from the supply port into the opening(s) 28 into spool 4 and then to the end of the jet pipe 18' extending into the spool.

With this arrangement, the jet pipe 18' can be in the form of a pipe extending into the spool with a connector header piece 30 defining a flow channel from the jet pipe to the nozzle 19'. The header piece 30 can be formed integrally with the pipe or could be formed as a separate piece and attached to the pipe by e.g. brazing or welding. As only the header piece needs to be under pressure, making it as a separate component can be advantageous in terms of manufacturing.

Something is required to steer the nozzle 19' in response to motor current to control the valve by moving the spool. In conventional systems, this is provided by the body of the jet pipe extending out of the spool, preferably within a flexural tube. In the system of EP16461572 and of this disclosure, it is not necessary to have the externally extending jet pipe and so this could be replaced by e.g. a simple wire (not shown) which may be mounted in a flexural tube 26' and which is moved by the motor current to turn the nozzle to provide the desired flow to respective ends of the spool via the receiver.

The jet pipe, supplied by the spool thus also functions as the feedback spring needed in the conventional system.

Such a system has fewer component parts than conventional systems; there is less risk of leakage into the motor chamber as the supply pressure remains within the assembly; fewer connections and joints are required and the assembly can be smaller.

Figure 3:
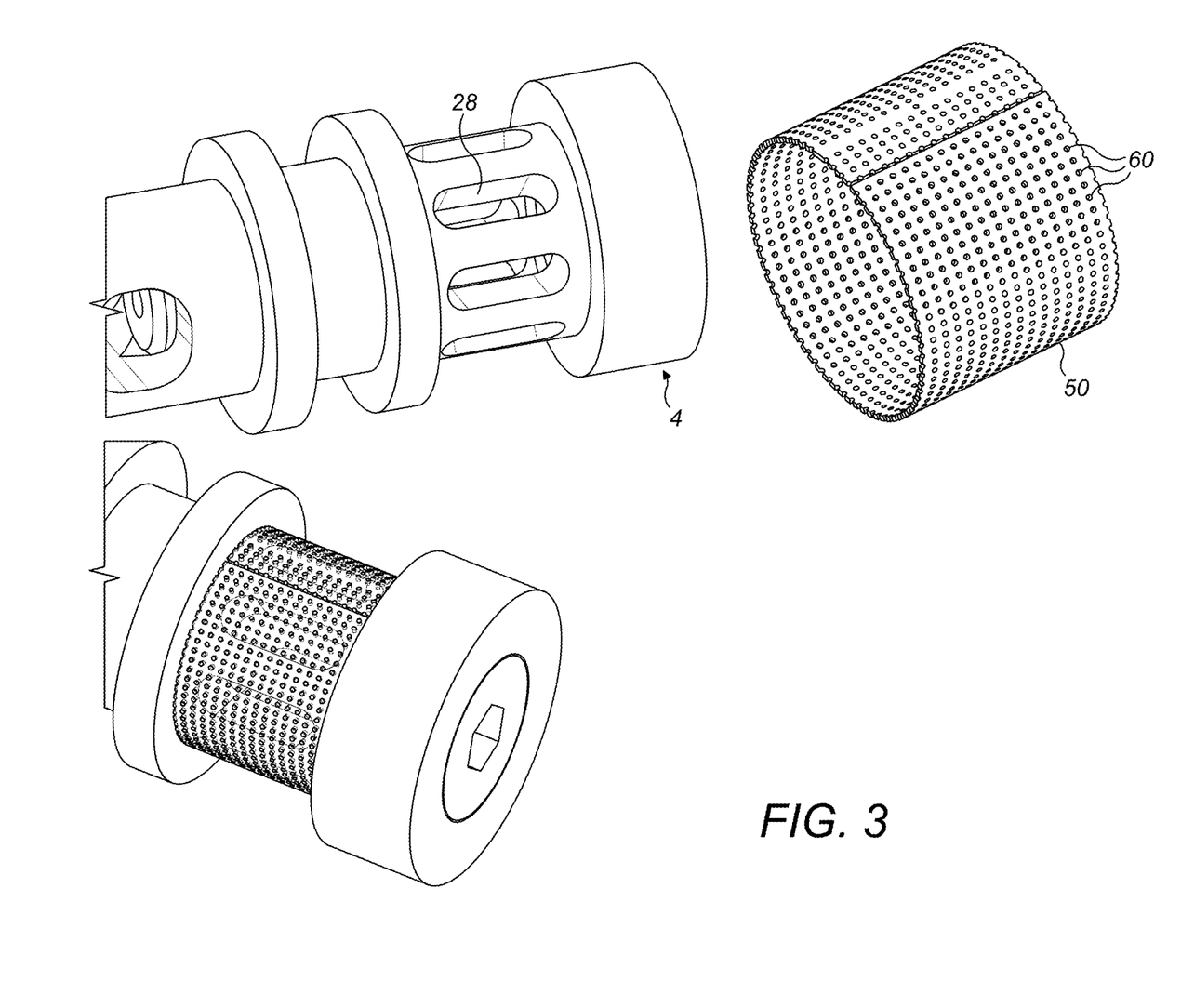
FIG. 3 shows a perspective view of one embodiment of a spool according to this disclosure.

According to the present disclosure, the assembly described above is improved by providing means for filtering the fluid as it enters the interior of the spool 4. The filter means is therefore provided on or in the spool body at the opening(s) 28 where the fluid enters the interior to be supplied to the jet pipe. One embodiment, shown in FIG. 3, modifies the assembly described above by providing a filter mesh 50 in and/or across the openings in the spool body. In the embodiment shown, the filter mesh 50 is formed of a perforated sheet or strip formed into a loop or band around the spool 4 where the openings 28 are located, such that the openings are covered by the perforated mesh. The perforations 60 are such as to allow the hydraulic fluid to pass through into the interior of the spool but to prevent contaminating particles and material passing into the spool. The perforated mesh is preferably attached to the spool body e.g. by welding, brazing or adhesion or other means of attachment. The perforations may be formed by e.g. laser or in any other known manner. The sheet could be wrapped around the spool in an already perforated state, or an unperforated sheet could be wrapped around the spool, fixed in place e.g. by welding, and then welded, on the spool. This would reduce the cost of laser cutting. In other embodiments (not shown) the filter mesh or material could be disposed, e.g. welded or adhered, only across the opening(s) or within the opening(s).

Figure 4:
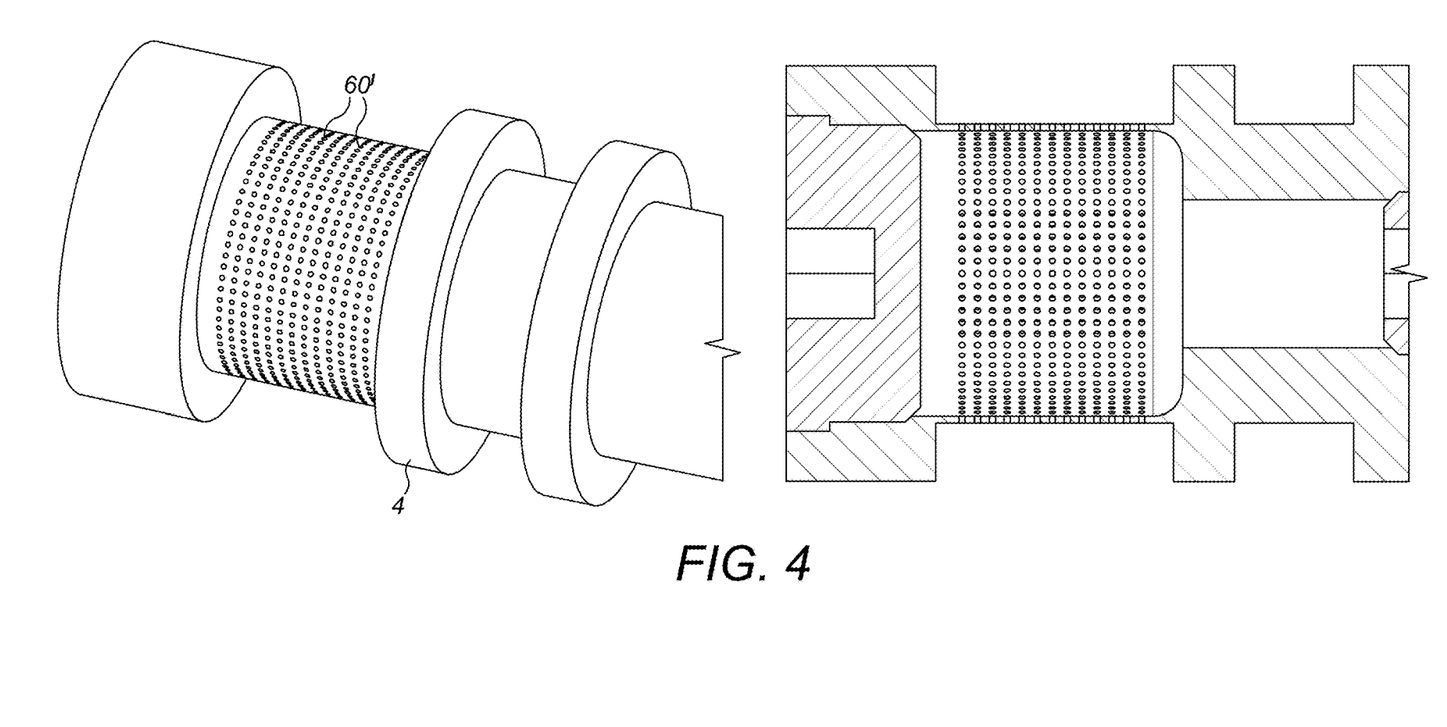
FIG. 4 shows a perspective view of another embodiment of a spool according to this disclosure.

FIG. 4 shows an alternative embodiment in which the openings are actually formed by the filtering perforations 60', these being formed in the wall of the spool itself—i.e. the wall or part of the wall is perforated and the perforations function both as the opening(s) through which the fluid passes into the interior of the spool and also as a fluid filter. In this embodiment, the wall of the spool needs to be thin enough to reduce pressure losses, but a thinner wall provides less support to withstand high valve pressures and so careful machining consideration is required. A combination of the above described embodiments is also possible, combining thinner perforated wall sections to provide the filtering openings, and thicker sections, without perforations, for support.

Figure 5:
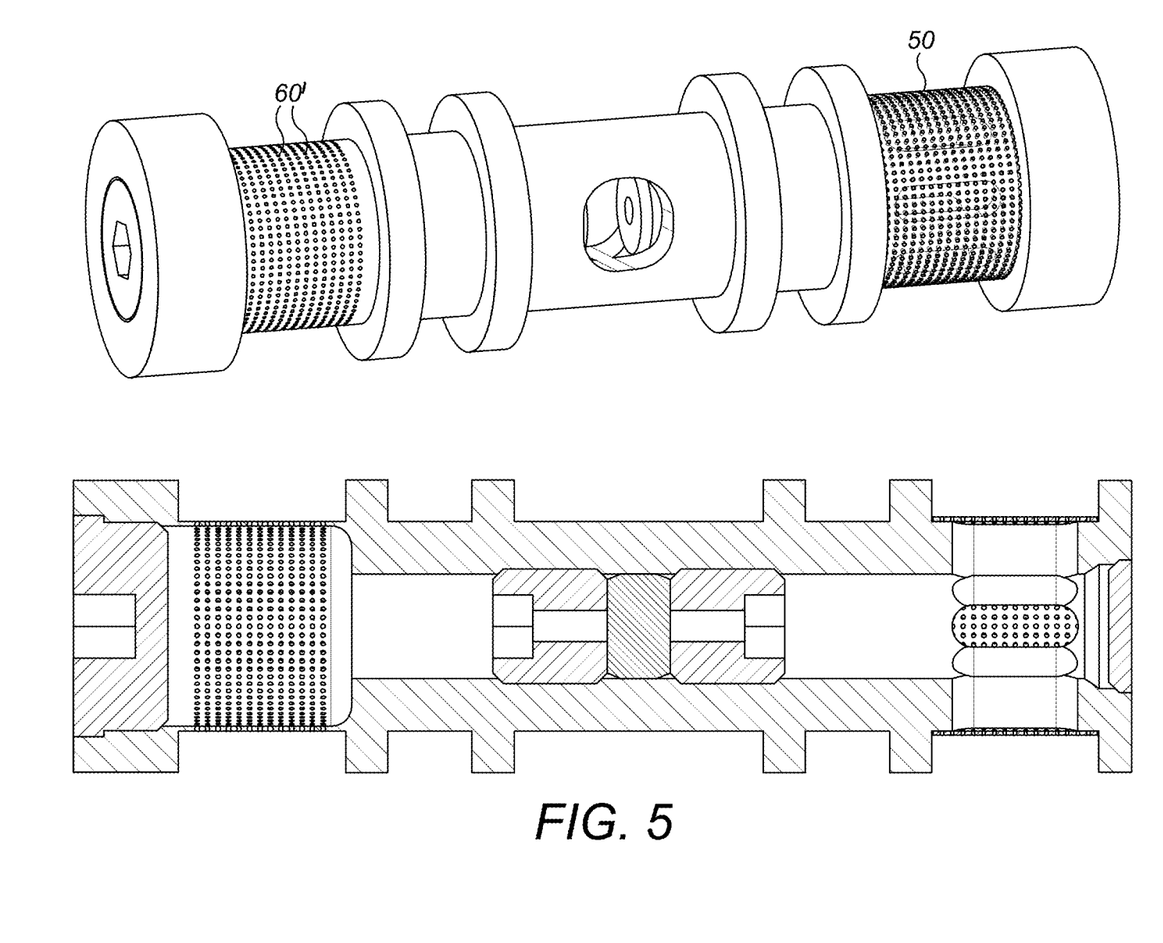
FIG. 5 shows a perspective view of another embodiment of a spool according to this disclosure.

FIG. 5 shows, for ease of explanation and comparison, both preferred embodiments (of FIG. 3 and FIG. 4) on a single spool body.

As compared to conventional servovalve arrangements with an additional filter component, the number of parts in the system of this disclosure is reduced, thus reducing cost, manufacturing time and complexity and scope for parts failure. A relatively large filtration area is possible providing more reliable and effective filtration. Further, no additional space is required in the valve assembly for a filter and so the overall size and weight of the assembly is minimised.

Although this disclosure has been described in terms of preferred examples, it should be understood that these examples are illustrative only and modifications and alterations are possible within the scope of the claims.

The invention claimed is:

1. A servovalve comprising:
a fluid transfer valve assembly comprising a supply port and a control port;
a moveable valve spool arranged to regulate flow of fluid from the supply port to the control port in response to a control signal; and
a jet pipe assembly configured to axially move the moveable valve spool relative to the fluid transfer valve assembly in response to the control signal to regulate the fluid flow;
wherein the jet pipe assembly comprises a steerable nozzle from which fluid is directed to the ends of the spool in an amount determined by the control signal; and
wherein fluid is provided to the nozzle via a connector header in fluid communication with the interior of the spool, the spool being provided with one or more openings in a body of the spool via which fluid from the supply port enters the interior of the moveable valve spool and flows into the connector header and to the steerable nozzle; and
wherein filter means for filtering the fluid entering the interior of the moveable valve spool are provided in or across the one or more openings;
wherein the filter means comprises the one or more openings being in the form of perforations formed in the spool.

2. The servovalve of claim 1, wherein the filter means comprises a filter mesh provided across the one or more openings.

3. The servovalve of claim 2, wherein the filter mesh is in the form of a perforated sheet wrapped around the spool to cover the one or more openings, or wherein the filter mesh is in the form of a perforated material fixed across each of the one or more openings, or wherein the filter mesh is in the form of a filter material formed within the one or more openings.

4. The servovalve of claim 1, further comprising drive means for steering the nozzle in response to the control signal.

5. The servovalve of claim 1, wherein the nozzle is provided at an end of a jet pipe (18') closest to the valve assembly and fluid from the nozzle is directed into the valve assembly via a receiver.

6. The servovalve of claim 5, wherein the receiver is configured such that when the nozzle is in a central position, fluid enters the valve assembly evenly via both sides of the receiver when the nozzle is steered to an off-centre position, more fluid flows to one side of the valve assembly than the other via the receiver.

7. The servovalve of claim 6, wherein the receiver comprises lateral receiver channels to provide flow to each side of the valve assembly.

8. The servovalve of claim 1, wherein the connector header is formed integrally with the nozzle or wherein the connector header is formed as a separated component and attached to the nozzle.

9. The servovalve of claim 1, wherein the connector header comprises an inlet to receive supply fluid and an outlet in fluid communication with the nozzle.

10. The servovalve of claim 1, wherein the nozzle is provided on a jet pipe mounted within a flexible tube, wherein the tube imparts movement to the jet pipe to steer the nozzle in response to the control signal.

11. The servovalve of claim 10, wherein the jet pipe comprises a nozzle portion and a main body portion.

12. The servovalve of claim 11, wherein the main body portion is in the form of a tube or wherein the main in body portion is in the form of a rod or wire.

* * * * *